US010454382B2

(12) United States Patent
Op Het Veld et al.

(10) Patent No.: US 10,454,382 B2
(45) Date of Patent: Oct. 22, 2019

(54) HALF BRIDGE RESONANT CONVERTERS, CIRCUITS USING THEM, AND CORRESPONDING CONTROL METHODS

(71) Applicant: SIGNIFY HOLDING B.V., Eindhoven (NL)

(72) Inventors: Johannes Hubertus Gerardus Op Het Veld, Eindhoven (NL); David Llewellyn John, Eindhoven (NL); Reinhold Elferich, Eindhoven (NL); William Peter Mechtildis Marie Jans, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/083,809

(22) PCT Filed: Apr. 11, 2017

(86) PCT No.: PCT/EP2017/058660
§ 371 (c)(1),
(2) Date: Sep. 10, 2018

(87) PCT Pub. No.: WO2017/178478
PCT Pub. Date: Oct. 19, 2017

(65) Prior Publication Data
US 2019/0089254 A1    Mar. 21, 2019

(30) Foreign Application Priority Data

Apr. 14, 2016 (EP) .................................... 16165365

(51) Int. Cl.
*H02M 3/335* (2006.01)
*H02M 1/08* (2006.01)
(Continued)

(52) U.S. Cl.
CPC ......... *H02M 3/33569* (2013.01); *H02M 1/08* (2013.01); *H02M 3/07* (2013.01);
(Continued)

(58) Field of Classification Search
CPC .... H02M 3/33569; H02M 3/07; H02M 3/335; H02M 3/3378; H02M 1/08; H02M 7/537;
(Continued)

(56) References Cited

U.S. PATENT DOCUMENTS 6,222,744 B1    4/2001   Pernyeszi
6,473,320 B2   10/2002   Randazzo
7,298,634 B2   12/2007   Yasumura
8,755,199 B2    6/2014   Stuler
(Continued)

FOREIGN PATENT DOCUMENTS

EP       2980993 A1    2/2016
JP    2002004786 A    1/2002
(Continued)

OTHER PUBLICATIONS www.st.com, "An Introduction to LLC Resonant Half-Bridge Converter", AN2644 Application Note, Rev 2, Sep. 2008, pp. 1-64.
(Continued)

*Primary Examiner* — Gary L Laxton
*Assistant Examiner* — Jye-June Lee
(74) *Attorney, Agent, or Firm* — Daniel J. Piotrowski

(57) ABSTRACT

A half bridge resonant converter comprises a half bridge inverter having a high side switch and a low side switch with an output defined from a node between the high side switch and the low side switch. The output connects to a resonant circuit. There are separate control circuits for generating the gate drive signals for controlling the switching of the high side switch and low side switch, in dependence on an electrical feedback parameter, each with different reference voltage supplies.

15 Claims, 11 Drawing Sheets

(51) Int. Cl.
  *H05B 33/08* (2006.01)
  *H02M 3/337* (2006.01)
  *H02M 7/5383* (2007.01)
  *H02M 3/07* (2006.01)
  *H02M 7/537* (2006.01)
  *H02M 7/48* (2007.01)

(52) U.S. Cl.
  CPC ......... *H02M 3/335* (2013.01); *H02M 3/3378* (2013.01); *H02M 7/537* (2013.01); *H02M 7/53832* (2013.01); *H05B 33/0809* (2013.01); *H05B 33/0815* (2013.01); *H02M 2007/4815* (2013.01); *Y02B 20/348* (2013.01); *Y02B 70/1433* (2013.01); *Y02B 70/1441* (2013.01)

(58) Field of Classification Search
  CPC ...... H02M 7/53832; H02M 2007/4815; H05B 33/0809; H05B 33/0815; Y02B 70/1441; Y02B 70/1433
  See application file for complete search history.

(56) References Cited

U.S. PATENT DOCUMENTS

| | | | |
|---|---|---|---|
| 9,257,913 B1* | 2/2016 | McDonald | H02M 3/33569 |
| 2001/0036090 A1 | 11/2001 | Halberstadt | |
| 2012/0319744 A1 | 12/2012 | Balakrishnan | |
| 2017/0179833 A1* | 6/2017 | Adragna | H02M 3/335 |

FOREIGN PATENT DOCUMENTS

| | | |
|---|---|---|
| JP | 2013198313 A | 9/2013 |
| WO | WO2006103606 A1 | 10/2006 |
| WO | WO2009037613 A1 | 3/2009 |

OTHER PUBLICATIONS

NXP, "Resonant Power Supply Control IC with PFC", TEA1713T, Rev. 2, Feb. 9, 2011, pp. 1-47.

Silica, Power Management, Designers' Journal, Edition 2013, pp. 1-82.

* cited by examiner

HALF BRIDGE RESONANT CONVERTERS, CIRCUITS USING THEM, AND CORRESPONDING CONTROL METHODS

CROSS-REFERENCE TO PRIOR APPLICATIONS

This application is the U.S. National Phase application under 35 U.S.C. § 371 of International Application No. PCT/EP2017/058660, filed on Apr. 11, 2017, which claims the benefit of European Patent Application No. 16165365.4, filed on Apr. 14, 2016. These applications are hereby incorporated by reference herein.

FIELD OF THE INVENTION

This invention relates to the use of half bridge resonant converters. By way of example, such resonant converters may be used to form part of a power converter to provide AC/DC conversion, to provide DC/DC conversion, to provide AC/DC conversion with power factor correction, or to provide DC/AC conversion, i.e. inversion.

BACKGROUND OF THE INVENTION

So-called resonant converters have a resonant circuit, which can be a series or parallel or series-parallel resonant circuit. When configuring converters, one aim is to keep losses low. For example, resonant converters which comprise an LLC series-parallel resonant circuit having two inductances and one capacitance are well-known. Such converters have the advantage that energy-efficient operation with relatively low switching losses is possible.

Resonant LLC converters are well known for use within LED drivers. The converters can be configured or operated as a constant current source or a constant voltage source. A constant current source can be used to drive an LED arrangement directly, thus enabling a single stage driver. Constant voltage sources can be used, for example, for LED modules which have further driver electronics in order to ensure a corresponding power supply to the LEDs with a predetermined current from the output voltage provided by the constant voltage source.

The LLC converter comprises a switching arrangement (which together with the gate driving arrangement is generally referred to as the inverter) for controlling the conversion operation, and the switching is controlled using feedback or feedforward control, in order to generate the required output.

Another function implemented within a power converter which is supplied with mains (or other AC) power is power factor correction (PFC). The power factor of an AC electrical power system is defined as the ratio of the real power flowing to the load to the apparent power in the circuit. A power factor of less than one means that the voltage and current waveforms are not in phase, reducing the instantaneous product of the two waveforms. The real power is the capacity of the circuit for performing work in a particular time. The apparent power is the product of the current and voltage of the circuit. Due to energy stored in the load and returned to the source, or due to a non-linear load that distorts the wave shape of the current drawn from the source, the apparent power will be greater than the real power.

If a power supply is operating at a low power factor, a load will draw more current for the same amount of useful power transferred than for a higher power factor.

The power factor can be increased using power factor correction. For linear loads, this may involve the use of a passive network of capacitors or inductors. Non-linear loads typically require active power factor correction to counteract the distortion and raise the power factor. The power factor correction brings the power factor of the AC power circuit closer to 1 by supplying reactive power of opposite sign, adding capacitors or inductors that act to cancel the inductive or capacitive effects of the load.

Active PFC makes use of power electronics to change the waveform of the current drawn by a load to improve the power factor. Active PFC circuits may for example be based on buck, boost or buck-boost switched mode converter topologies. Active power factor correction can be single-stage or multi-stage.

In the case of a switched mode power supply, a PFC boost converter is for example inserted between the bridge rectifier and the mains storage capacitor. The boost converter attempts to maintain a constant DC bus voltage on its output while drawing a current that is always in phase with and at the same frequency as the line voltage. Another switched-mode converter inside the power supply produces the desired output voltage or current from the DC bus.

Due to their very wide input voltage range, many power supplies with active PFC can automatically adjust to operate on AC power for example from about 110 V to 277V.

Power factor correction may be implemented in a dedicated power factor correction circuit (called a pre-regulator), for example placed between the (mains) power supply and the switch mode power converter which then drives the load. This forms a dual stage system, and this is the typical configuration for high power LED applications (for example more than 25 W). The power factor correction may instead be integrated into the switch mode power converter, which then forms a single stage system.

In this case, there is a single resonant tank and switching arrangement, which then implements both power factor correction as well as control of the conversion ratio between the input and output in order to maintain the desired output (current in the case of an LED driver) delivered to the load.

LLC DC/DC converters are either operated at a DC supply voltage (e.g. 48V in telecommunications or data center applications), or they are used as the second stage of a mains power supply or two stage LED driver, in which the front end stage (the power factor correction pre-regulator) provides the power factor correction and also generates a stabilized bus voltage that forms the DC input voltage for the LLC.

An example of a resonant AC/DC converter is shown in FIG. 1.

The circuit comprises a DC input terminal 2 (labeled B in FIG. 1 and all other figures) which connects to a half-bridge having a first power switch 28 and a second power switch 30. The first switch and the second switch can be identical, and the half-bridge may for example operated at a symmetrical 50% duty cycle. These switches can be in the form of field-effect transistors.

A resonant tank circuit 25 is connected to a switch node, labeled X in FIG. 1 and all other figures between the two switches 28, 30.

Each switch has its timing of operation controlled by its gate voltage. For this purpose, there is a control block 31 (including a low voltage supply). The block 31 receives a control signal CTRL for controlling the gate voltages and a supply voltage SUP. Feedback (not shown) is used to determine the timing of the control of the switches 28, 30.

The output of the resonant tank circuit 25 connects to a rectifier 32 and then to the load, in parallel with a smoothing capacitor $C_{DC}$.

During operation of the converter, the controller 31 controls the switches, at a particular frequency and in complementary manner.

FIG. 2 shows one more detailed example of the circuit of FIG. 1.

In this example, the resonant tank 25 is in the form of an LLC resonant circuit, and it may be used to form a PFC stage. The circuit may thus be used as a PFC pre-regulator by having a controlled output voltage. It could also be used as a single stage LED driver by having a controlled output current.

The circuit comprises a mains input 10 which is followed by a rectifier bridge 12 having a high frequency filter capacitor 14 at the output. This generates the supply for the input terminal 2 (node B) of FIG. 1.

This example shows a converter with an isolated output. For this purpose, the converter comprises a primary-side circuit 16 and a secondary side 18. There is electrical isolation between the primary-side circuit 16 and the secondary side 18. A transformer comprising a primary coil 20 and a secondary coil 22 is provided for the isolation. The transformer has a magnetizing inductance 20 which also acts as one of the inductances of the series LLC resonant circuit. The LLC resonant circuit 25 has a second inductance 24, and a capacitance (formed as two capacitors 26 and 27 in this example).

In an LLC circuit, the inductances and capacitor may be in any series order. The inductor may comprise discrete components or it may be implemented as leakage inductances of the transformer.

The primary-side circuit 16 comprises the half-bridge 28, 30 and the resonant tank circuit 25.

The control block 31 is shown schematically as including two voltage sources.

The secondary side 18 has the rectifier 32 which is connected downstream of the secondary coil 22 and which can be formed, for example, by a first diode arrangement of diodes 32a and 32b and a second diode arrangement of diodes 34a and 34b.

FIG. 2 shows a full-bridge rectifier and a single secondary coil which couples at its ends to the rectifier circuit. The low frequency (e.g. 100 Hz) storage capacitor $C_{DC}$ is connected between the outputs of the rectifier. The LED load or other output stage is represented in this figure by a resistor. It comprises an LED or a plurality of LEDs.

The circuit shown in FIG. 2 is thus an AC/DC PFC converter, comprising an AC input 10, a rectifier 12, a half bridge inverter comprising a high side switch (the first power switch 28) and a low side switch (the second power switch 30), wherein an output is defined from a switch node X between the switches. The self-oscillating LLC circuit 20,24,26,27 is coupled to the output.

FIG. 3 shows an alternative LLC half bridge topology, as a modification to FIG. 2 (and showing DC/DC conversion) in which the secondary coil 22 has a center tap and the full wave rectifier 32 is then implemented by two diodes. The LLC capacitor is also shown as a single component 35.

The half bridge converter shown above may be used in a AC/DC (single stage) PFC converter, or in a DC/DC converter, or in an AC/DC converter without implementing power factor correction. In the case of a DC/DC converter, the rectifier bridge 12 and filter capacitor 14 are simply omitted as in FIGS. 1 and 3. The half bridge converter may also be used in a DC/AC converter, i.e. a resonant half bridge inverter. The resonant tank circuit 25 may also be of other types, and the invention is not limited to LLC circuits.

In the case of DC/AC conversion, a load is connected to the output of the resonant tank circuit whereas in case of DC/DC or AC/DC conversion the load is connected via the active or passive rectifier network to the resonant tank circuit.

Half bridge resonant converters are used already in many applications like DC/AC converters for lighting applications, e.g. low- and high-pressure discharge lamp circuits, and DC/DC converters, e.g. DC power supplies and LED drivers.

The control block 31 drives the two power switches 28, 30 to conduct in an alternating sequence on and off, with a small non-conduction phase (dead time) used to avoid cross conduction of the power switches. A high gate drive signal turns on one switch and turns off the other switch and a low gate drive signal turns off the one switch and turns on the other switch. The advantage of using a resonant half bridge converter is that the current flowing into the switch node X has a phase lag, with respect to the switch node voltage Vx, and can serve to discharge the (parasitic) output capacitance of the switch before it will be switched-on.

This method is referred to as Zero Voltage Switching (ZVS) and implies zero switching losses due to the parasitic output capacitance. If the output current is not large enough or even zero and further depending on the operation conditions (in terms of the half bridge, output, and resonant capacitor voltage), discharging of the parasitic output capacitance will be partly or even completely achieved by the power switch which results in hard switching. This results in switching losses which depend on the switching frequency, the parasitic output capacitance of the switch and the voltage across the parasitic capacitance at switch-on. In order to reduce the switching losses, Valley Switching (VS) can be applied which causes a switch to switch-on at the minimum voltage across it. Valley switching can be implemented by means of an end-of-slope detection mechanism. Zero voltage switching is a special case of valley switching where the voltage is minimal and zero.

In order to avoid critical timing of the switch turn-on, a diode can be placed in anti-parallel to the power switch 28, 30 if a bipolar junction transistor is used. This anti-parallel diode may be omitted for a MOSFET because it already has a body diode inside. The anti-parallel diode will start conducting if the switch is not switched on immediately after discharging of the voltage across the switch has occurred, and then the switch can take over a bit later when it is eventually turned on.

Zero voltage switching ensures that the voltage across a switch is zero before it will be switched on and as such eliminates switching losses which makes high frequency (HF) operation possible. HF operation enables a reduction in the size of capacitive and inductive components used in the resonant tank circuit which makes smaller and cheaper designs possible.

In these circuits, the first power switch 28 connected to the rectified mains (or other DC input) needs a drive signal which should be close to the switch node voltage Vx which can range from ground up to the high rectified mains voltage (or other DC voltage) at terminal 2 for switching on and off. This means that a level shifter function is needed.

FIG. 4 shows a driver transformer for this purpose. There are two secondary coils 40, 42 each connected across the source and drain of a respective one of the power switches 28, 30. The secondary coil 40 sets the gate voltage of the first power switch 28 relative to the switch node X and the secondary coil 42 sets the gate voltage of the second power switch 30 relative to ground. The secondary coils have opposite polarity to provide the complementary switching.

FIG. 5 shows a high voltage level shifting integrated circuit 50 having a level shifting unit 52 and gate driver circuits 54, 56 for the first and second power switches 28, 30.

By way of example, it may be desired to implement switching frequencies as high or even higher than 1 MHz and with a maximum rectified mains voltage of 375V. This voltage level should be able to be raised to at least 500V whilst still preventing damage of the switches and drive circuits during mains surges.

The two level shift implementations shown have drawbacks.

A transformer level shifter can be used for both low frequency and high frequency operation and an isolation voltage of 500V can indeed be achieved. However, it draws four times more power than needed to supply the gate charge of the power switch and the unavoidable leakage inductance in the transformer causes ringing. In the case of low frequency applications, the extra dissipation might be not a problem but for high frequency applications, the additional power dissipation will be an issue. Additionally, the ringing suppression measures which may be required cause severe turn on/off delays which might be not acceptable in high frequency operations.

The high voltage IC level shifter is currently only available for low frequency operation, not higher than about 1 MHz.

This invention relates to an improvement to the system for generating and applying the control signals to the power switches of the half bridge converter to address the issues explained above.

SUMMARY OF THE INVENTION

The invention is defined by the claims.

Examples in accordance with a first aspect of the invention provide a half bridge resonant converter, comprising:

a pair of DC voltage lines arranged to provide a bus voltage, wherein the pair of DC voltage lines comprises a high voltage line and a low voltage line;

a half bridge inverter in series between the high voltage line and the low voltage line, wherein the half bridge inverter comprises a high side switch and a low side switch, wherein an output of the half bridge inverter is defined from a node between the high side switch and the low side switch;

a resonant circuit coupled to the output of the half bridge inverter;

a first control circuit for generating a gate drive signal for controlling the switching of the high side switch, wherein the first control circuit is arranged to control a duty cycle of the high side switch by increasing the on-time of the high side switch if an average switch node voltage is lower than a fraction of the bus voltage and by decreasing the on-time of the high side switch if the average switch node voltage is higher than the fraction of the bus voltage; and a second control circuit for generating a gate drive signal for controlling the switching of the low side switch in dependence on an electrical feedback parameter.

The first and second control circuits may be considered to be part of the inverter.

This converter makes use of separate circuits for generating the gate drive signals for the two power switches of the inverter, each with their own voltage domain. In this way, the circuits can use primarily low voltage components, with the number of high voltage components reduced to a minimum.

One circuit is referenced to ground and the other is referenced to the switch node between high side switch and the low side switch. This eliminates the need for a driver transformer or high voltage integrated circuit. The two control circuits may be designed to provide zero voltage switching when possible or valley switching if not, in order to eliminate or reduce switching losses whenever possible.

The converter may further comprise the first control circuit, arranged to turn on the high side switch after the low side switch is turned off and a dead-time has elapsed.

The turn on of the high side switch is set after the low side switch has turned off and a dead-time has elapsed. This allows for an easy switching control implementation.

The converter may further comprise the second control circuit, arranged to turn on the low side switch after the high side switch is turned off and a dead-time has elapsed.

The turn on of the low side switch is set after the high side switch has turned off and a dead-time has elapsed. This allows for an easy switching control implementation.

The converter may further comprise the second control circuit, arranged to control an output power and/or a power factor of the half bridge resonant converter by controlling the low side switch.

The control topology as proposed in the application is specifically suited for an easy implementation for controlling the output power and/or providing a high power factor.

The converter preferably further comprises a first generating circuit for generating the first supply voltage from the high voltage line and from the voltage at the switch node between the high side switch and the low side switch, and a second generating circuit for generating the second supply voltage from the low voltage line and from the voltage at the switch node between the high side switch and the low side switch.

In this way, the high supply voltage for each control circuit is derived from the two supply voltages and the voltage at the switch node between the high side switch and the low side switch. The generating circuits may use high voltage components, but then the supply voltages generated enable the control circuits to be formed as low voltage circuits.

The generating circuit may be used only during startup of the circuit, before oscillation has settled. Once the circuit is oscillating part of the generating circuits may be disabled.

The first generating circuit may comprise:

a first input for receiving a voltage between (i) the switch node between the high side switch and the low side switch and (ii) the resonant circuit;

a charge pump circuit for converting the AC voltage at the first input into a DC voltage and storing it on a first output capacitor as the output of the first generating circuit at the first supply voltage; and a supply transistor between the high voltage line and the output of the first generating circuit.

The supply transistor may be the only high voltage component required. It is used to provide a power supply during startup. The feedback voltage from the resonant circuit, i.e. the first input, can then be used to provide the power supply for controlling the half bridge switching.

The second generating circuit may comprise:

a second input for receiving a voltage between the resonant circuit and the low voltage line;

a charge pump circuit for converting the AC voltage at the second input into a DC voltage and storing it on a second output capacitor as the output of the second generating circuit at the second supply voltage; and a supply transistor between (i) the switch node between the high side switch and the low side switch and (ii) the output of the second generating circuit.

Again, the supply transistor may be the only high voltage component required and is used to provide a power supply during startup. The feedback voltage from the resonant circuit, i.e. the first input, can then be used to provide the power supply for controlling the half bridge switching.

The first and second generating circuits may employ dedicated auxiliary windings added to the transformer (when one is used). These can be considered as floating high frequency AC supply voltages connected with a first terminal to either ground (for the first generating circuit) or the switch node (for the second generating circuit) while the respective second terminal is connected to a rectifier diode supplying the voltage domain.

The first control circuit may comprise:
a first end of slope detection circuit having as input the high voltage line;
a first latch element triggered by the end of slope detection circuit and which generates a first control signal for switching the high side switch to a first state; and
a first signal generator for generating a second control signal for switching the high side switch to a second state.

In this circuit, the first state may be an ON state. The ON transition is thus generated by end of slope detection, which ensures that the switch will be turned on at the minimum voltage across its parasitic output capacitance. This enables ZVS or VS to be implemented.

The first signal generator may have a reference input for controlling the duration of the first state. This reference input may be generated by a resistive divide between the high and low voltage lines. It controls the ON time of the high side switch.

The second control circuit may comprise:
a second end of slope detection circuit having as input the switch node;
a second latch element triggered by the end of slope detection circuit and which generates a third control signal for switching the low side switch to a first state; and
a second signal generator for generating a fourth control signal for switching the low side switch to a second state.

Again, the first state may be the ON state and the second state is then the OFF state. The second signal generator for example has a feedback control input for controlling the duration of the first state in dependence on the electrical feedback parameter.

The electrical feedback parameter for example comprises a voltage which is dependent on the output current delivered by the converter to a load.

A transformer may be provided between the resonant circuit and an output load. This enables isolation of the output. The resonant circuit for example comprises an LLC circuit.

The invention also provides an apparatus comprising:
the converter as defined above; and
the output load.

The output load may be an LED arrangement of one or more LEDs.

Examples in accordance with another aspect of the invention provide a conversion method, comprising:
operating a half bridge inverter comprising a high side switch and a low side switch between a DC high voltage line and a DC low voltage line, using a gate drive signal and providing an output from a switch node between the high side switch and the low side switch;
providing the output of the half bridge inverter to a resonant circuit;
generating a gate drive signal using a first control circuit, for controlling the switching of the high side switch in dependence on an electrical feedback parameter, wherein the first control circuit has as its reference voltage supply the voltage at the switch node between the high side switch and the low side switch and a first supply voltage greater than the voltage at the switch node between the high side switch and the low side switch; and
generating a gate drive signal using a second control circuit, for controlling the switching of the low side switch in dependence on the electrical feedback parameter, wherein the second control circuit has as its reference voltage supply the low voltage line and a second supply voltage greater than the voltage at the low voltage line.

This method makes use of separate circuits for generating the gate drive signals for the two power switches of the inverter, each with their own voltage domain. In this way, the circuits can use primarily low voltage components, with the number of high voltage components reduced to a minimum.

Another example of a method with another aspect of the invention provide a conversion method, comprising: operating a half bridge inverter comprising a high side switch and a low side switch between a DC high voltage line and a DC low voltage line providing a bus voltage, using a gate drive signal and providing an output from a switch node between the high side switch and the low side switch;
providing the output of the half bridge inverter to a resonant circuit;
generating a gate drive signal using a first control circuit, for controlling a duty-cycle of the high side switch by increasing the on-time of the high side switch if an average switch node voltage is lower than a fraction of the bus voltage and by decreasing the on-time of the high side switch if the average switch node voltage is higher than the fraction of the bus voltage; and
generating a gate drive signal using a second control circuit, for controlling the switching of the low side switch in dependence on an electrical feedback parameter.

The method may further comprise generating the first supply voltage from the high voltage line and from the voltage at switch node between the switches, and generating the second supply voltage from the low voltage line and from the voltage at switch node between the switches.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a half bridge resonant converter comprising a half bridge inverter having a high side switch and a low side switch with an output defined from a switch node between the high side switch and the low side switch. The output connects to a resonant circuit. There are separate control circuits for generating the gate drive signals for controlling the switching of the high side switch and low side switch, in dependence on an electrical feedback parameter, each with different reference voltage supplies.

Figure 6:
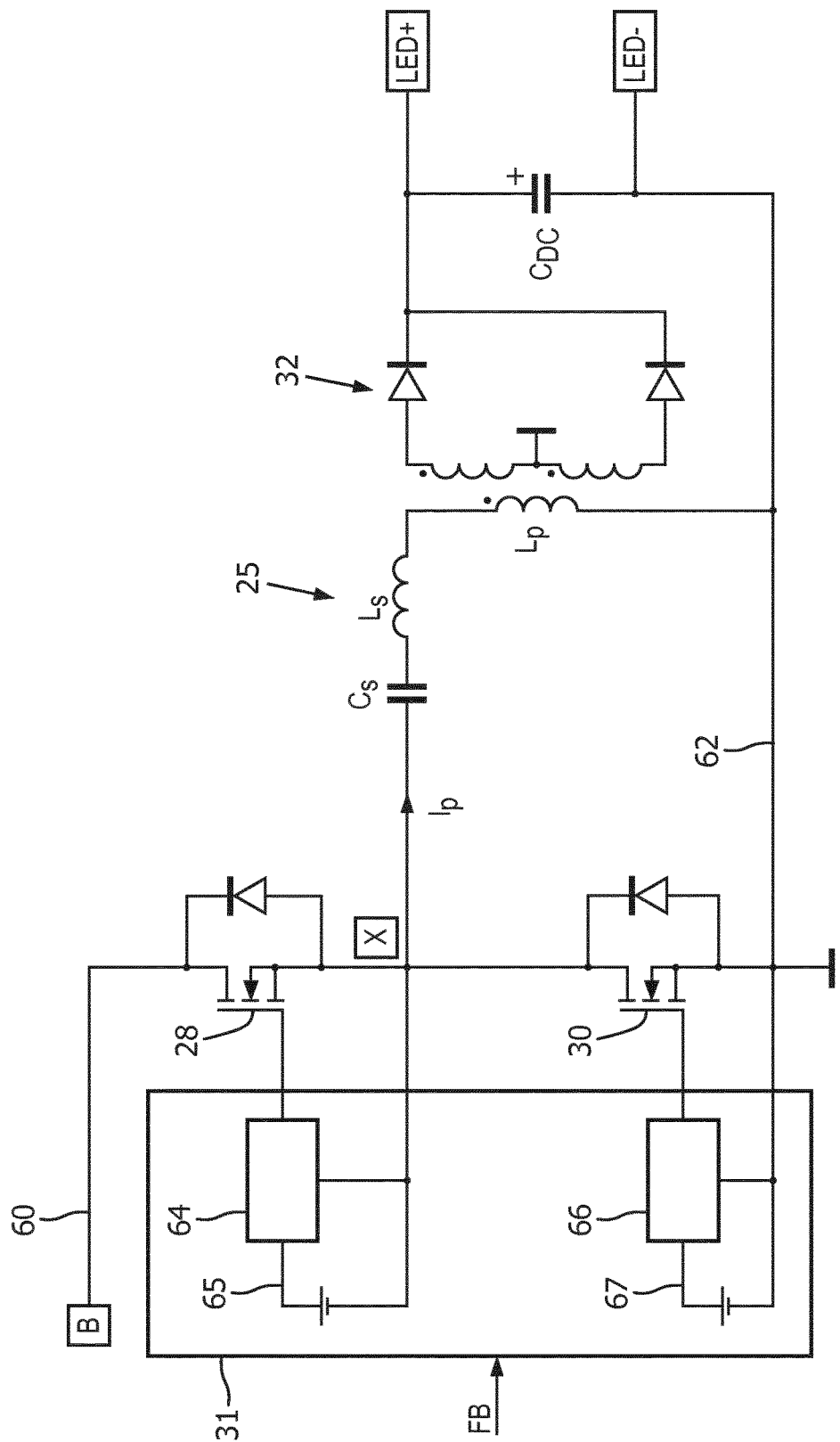
FIG. 6 shows an example of a circuit in accordance with the invention, in schematic form.

FIG. 6 shows converter using a half bridge topology with an LLC resonant tank circuit 25 and a full wave rectifier 32 controlled by two local control circuits.

The converter is supplied by a pair of DC voltage lines comprising a DC high voltage line 60 (node B) and a low voltage line 62, e.g. ground. As in the examples above, the half bridge inverter comprises a high side switch 28 and a low side switch 30 in series between the high voltage line 60 and the low voltage line 62. The output of the half bridge inverter is defined from the switch node X between the high side switch and the low side switch.

A first control circuit 64 generates a gate drive signal for controlling the switching of the high side switch 28 in dependence on an electrical feedback parameter (as discussed below). The first control circuit 64 has as its reference voltage supply the voltage at the switch node X and a first supply voltage 65 greater than the voltage at the switch node X. As explained below, the first supply voltage is generated from the main power supply before the circuit is oscillating but it is generated by feedback from the resonant circuit during oscillation, thereby saving power.

A second control circuit 66 generates a gate drive signal for controlling the switching of the low side switch 30, again in dependence on the electrical feedback parameter, wherein the second control circuit 66 has as its reference voltage supply the low voltage line 62 and a second supply voltage 67 greater than the voltage at the low voltage line. Again, the second supply voltage is generated from the main power supply before the circuit is oscillating but it is generated by feedback from the resonant circuit during oscillation, thereby saving power.

The feedback may directly control the timing of only one of the switches. However, it will then indirectly control the other in that there is a switching sequence between the two switches. Thus, the overall control block 31 may be considered to be the combination of the control circuits 64 and 66, and feedback control (shown as input FB) is used by the controller. The switching frequency is typically controlled, either based on a frequency control circuit or based on threshold detection of a self-oscillating resonant tank circuit 25.

This arrangement avoids the need for a level shifter transformer and also enables high frequency operation by using separate low voltage circuitry locally connected to both switches.

Figure 7:
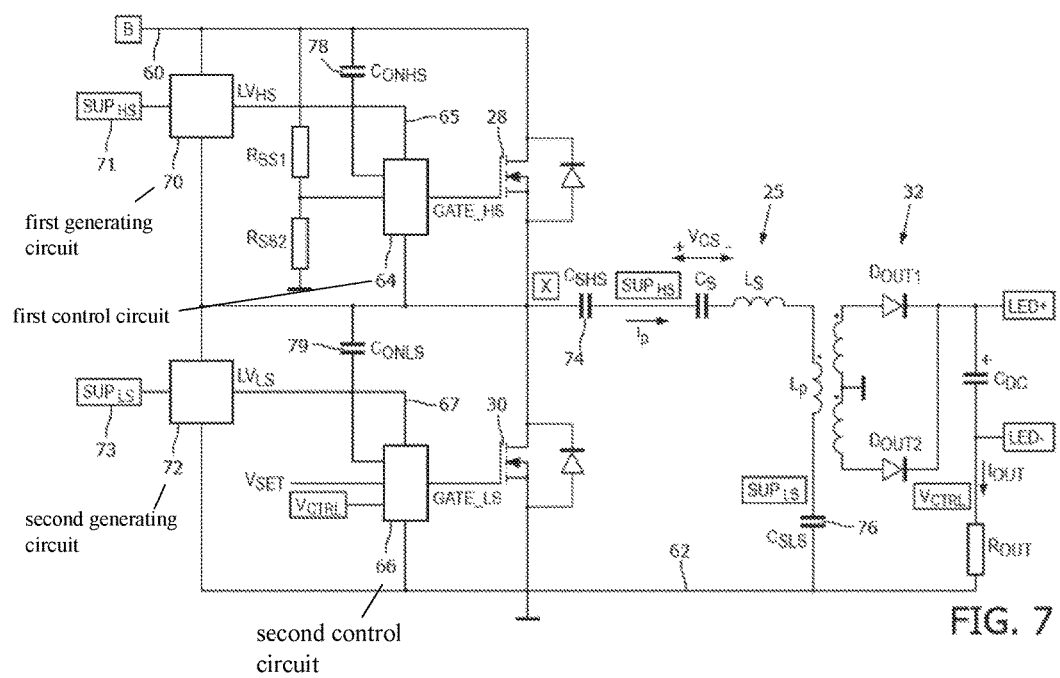
FIG. 7 shows an example of a circuit in accordance with the invention, in more detail.

FIG. 7 shows an implementation of the circuit in more detail.

A first generating circuit 70 is used for generating the first supply voltage 65 from the high voltage line 60 and from the voltage at the switch node X. A second generating circuit 72 is used for generating the second supply voltage 67 from the low voltage line 62 and from the voltage at the switch node X.

The first generating circuit 70 has a first input 71 for receiving a voltage $SUP_{HS}$ between the switch node X (Vx) and the resonant circuit. As shown, this high side supply voltage $SUP_{HS}$ is derived from a switch node between a series output capacitor 74 and the resonant circuit.

Capacitors 74 and 76 function as a capacitive voltage divider with respect to the resonant capacitor Cs. If for example the peak to peak voltage across Cs is 500V and Cs is 1 nF, the capacitor 74 may be about 20 nF to achieve a maximum voltage drop of about 25V for the supply, which practically turns into a lower value at the first supply voltage 65 ($LV_{HS}$) depending on the charge pump impedances (the charge pump is explained below with reference to FIG. 12) and the load. The voltage $SUP_{HS}$ is an AC voltage with respect to the switch node X.

This voltage is used to generate the power supply for controlling the switching of the high side switch, once the circuit is oscillating.

The second generating circuit 72 has a second input 73 for receiving a low side supply voltage $SUP_{LS}$ between the resonant circuit and the low voltage line 62. In particular this low side supply voltage $SUP_{LS}$ is derived from a switch node between the resonant circuit and a low side series capacitor 76, which capacitor then connects to the low voltage line 62.

This voltage is used to generate the power supply for controlling the switching of the low side switch, once the circuit is oscillating.

This arrangement achieves valley switching by using an end-of-slope trigger action as explained in more detail below. This is implemented using a capacitor 78 ($C_{ONHS}$) between the high voltage line 60 and the first control circuit 64, and a capacitor 79 ($C_{ONLS}$) between the switch node X and the low side control circuit 66.

The high side control circuit 64 receives power from the resonant tank circuit by means of the capacitor 74 and from the first generating circuit 70, and the low side control circuit 66 receives power from the resonant tank circuit by means of the capacitor 74 and the second generating circuit 72. Both local supplies need to be powered by alternative means before the start-of-oscillation occurs, and this requires a high voltage transistor for each. These high voltage transistors reside inside the generating circuits 70, 72 as shown below.

All the circuitry described may be implemented using low voltage discrete components, low voltage ICs or a combination of both, except for the end-of-slope sense capacitors 78, 79 and the high voltage supply transistor inside each generating circuit.

The capacitor arrangement ($C_{ONHS}$, $C_{ONLS}$) is used to ensure that the power switch will be switched on at the minimum voltage across its own (parasitic) output capacitance. This implies zero voltage switching when there is a sufficiently large current at the moment of switch-off of the complementary power switch.

Communication between the high side and low side drive circuit is established using the switch node voltage (Vx) information and by means of resistors $R_{SS1}$ and $R_{SS2}$. These form a potential divider between the high voltage line and the low voltage line, providing a 1:2 division of the voltage at terminal B. The output is used as a reference with which the average switch node voltage is compared, and the average is thus controlled to be half of the voltage at node B. This provides balancing control.

The on-signal is not directly transmitted but the previous off-signal causes the switch node commutation which in turn is sensed by the other voltage domain. Secondly, the switch node average voltage is explicitly controlled by one domain which implies the same on-time as the other domain but without direct transmission of any on-time signal between the voltage domains.

In the example shown, the voltage generated by the resistors $R_{SS1}$ and $R_{SS2}$ is used to control the on-time of the high side) switch 28. The on-time of the lower switch is then controlled by means of a feedback system. A feedback voltage $V_{CTRL}$ is compared with a reference level $V_{SET}$ to provide error based feedback control. In this example, the feedback voltage $V_{CTRL}$ is proportional to the output current $I_{OUT}$ of the converter. The output current $I_{OUT}$ supplies the LED string, connected between LED+ and LED−, and the output filter capacitor $C_{DC}$ which provides 100 Hz ripple reduction.

Note that the roles of the lower switch and upper switch control may be exchanged.

The feedback voltage is the voltage across an output resistor ROUT in response to the output current $I_{OUT}$ and the voltage $V_{CTRL}$ is controlled to be equal to the reference $V_{SET}$. This control loop thus controls the output current of the converter $I_{OUT}$.

The advantages of using these local drive circuits are that only cheap and fast low voltage components are involved to control and drive the local power switch except for a small and inexpensive capacitor of a few pF across each power switch, for example a 500V capacitor (i.e. the capacitors 78, 79). This results in automatic ZVS (Zero Voltage Switching) or VS (Valley Switching) for both power switches. Additionally, a simple and cheap local supplementary low voltage supply is derived from the resonant tank circuit using low voltage components. The initial supply voltage before start-of-oscillation can then be supplied e.g. via a low cost 500V BJT (Bipolar Junction Transistor) capable of handling a few mA. A MOSFET may instead be used.

Except for a few high voltage components, the local control circuitry can be integrated using a low voltage IC process (e.g. 10V to 25V). The same IC may be used twice for driving the high side and low side gate. The respective control task can be selected e.g. via external components.

Figure 8:
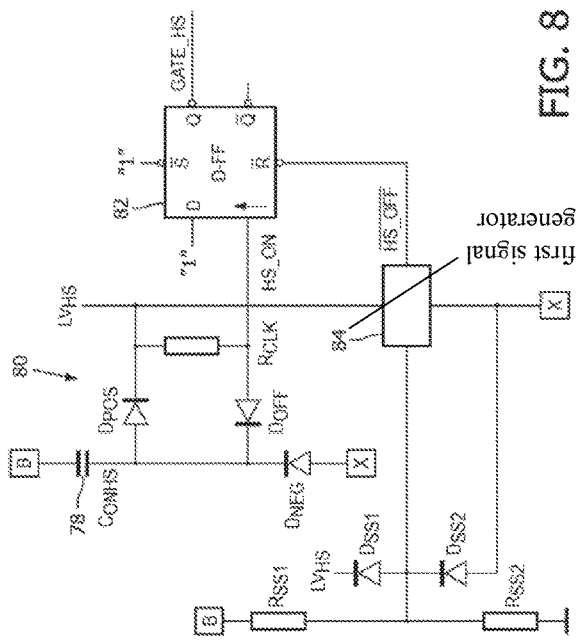
FIG. 8 shows an example of the implementation of the high side control circuit.
Figure 9:
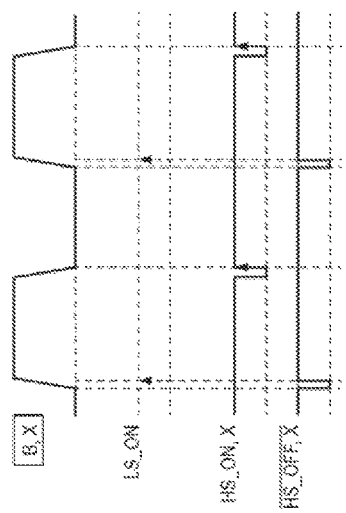
FIG. 9 shows a timing diagram for the operation of the circuit of FIG. 8.

FIG. 8 shows an implementation of the high side (first) control circuit 64 and FIG. 9 shows the operation using waveforms.

The first control circuit comprises a first end of slope detection circuit 80 having as input the high voltage line (node B). A first latch element 82, in this example in the form of a D-type flip flop, is triggered by the end of slope detection circuit 80 and generates a first control signal HS_ON for switching the high side switch to a first, ON, state. It is provided to the clock input of the flip flop.

A first signal generator 84 is used for generating a second control signal HS_OFF for switching the high side switch to a second state. Its inverse is provided to the (inverse) reset input of the flip flop 82. The first signal generator 84 has a reference input from the resistive divider $R_{SS1}$, $R_{SS2}$ for controlling the duration of the first state.

In this way, the high side control circuit 64 uses an end-of-slope detection mechanism formed by the capacitor 78 and a diode and resistor circuit ($D_{NEG}$, $D_{POS}$, $D_{OFF}$ and $R_{CLK}$) which triggers the positive edge triggered flip flop 82 ON at the end of the negative slope of $V_{B,X}$ (i.e. $V_B$ relative to $V_X$) and switches the high side power switch 28 on via the output from flip flop 82, GATE_HS.

The high side power switch 28 is switched off by means of the control signal HS_OFF in a manner which provides balancing.

FIG. 9 shows the control signals arising in the circuit.

The first positive pulse of $V_{B,X}$ is with the high side OFF and low side ON, so that $V_X$ is pulled down by the low side switch hence $V_B$ is greater than $V_X$. The low side switch is turned ON only after the high side switch as turned OFF, as shown.

The start of the negative slope in the voltage $V_{B,X}$ (caused by turning the low side off, LS_OFF) pulls down HS_ON (relative to the voltage at switch node X), and the next rising edge only arises at the end of the slope. Once the high side switch is ON there is the dip to zero in the voltage $V_{B,X}$.

Figure 10:
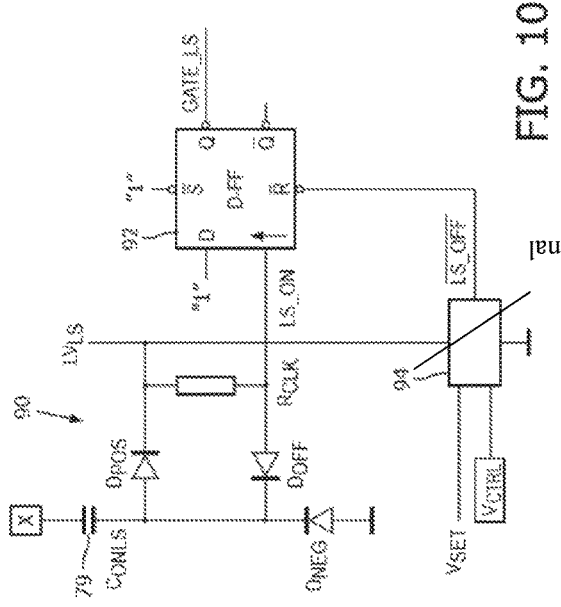
FIG. 10 shows an example of the implementation of the low side control circuit.
Figure 11:
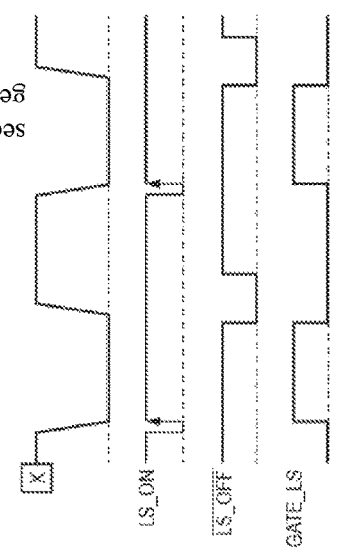
FIG. 11 shows a timing diagram for the operation of the circuit of FIG. 10.

FIG. 10 shows an implementation of the low side (second) control circuit 66 and FIG. 11 shows the operation using waveforms.

The second control circuit comprises a second end of slope detection circuit 90 having as input the switch node X. A second latch element 92, again in the form of a positive edge triggered D-type flip flop, is clocked by the end of slope detection circuit 90 and it generates a third control signal LS_ON for switching the low side switch to a first, ON, state.

A second signal generator 94 is used for generating a fourth control signal LS_OFF for switching the low side switch to a second state. Its inverse is provided to the (inverse) reset input of the flip flop 92. The second signal generator 94 receives the feedback control input VC FRL for controlling the duration of the first, ON, state in dependence on the feedback.

The low side control circuit 66 thus also uses an end-of-slope detection mechanism formed by the capacitor 79 and a diode and resistor circuit ($D_{NEG}$, $D_{POS}$, $D_{OFF}$ and $R_{CLK}$) which triggers the positive edge triggered flip flop ON at the end of the negative slope on the switch node voltage $V_X$ and switches the low side power switch 30 ON via the flip flop output GATE_LS.

FIG. 11 shows the control signals arising in the circuit.

The first dip in $V_X$ is with the high side OFF and low side ON, so that $V_X$ is pulled down by the low side switch.

The start of the negative slope in the voltage $V_X$ (caused by turning the high side off, HS_OFF seen in FIG. 9) pulls down LS_ON, and the next rising edge only arises at the end of the slope. Once the low side switch is ON there is the dip to zero in the voltage $V_X$. The rise in the voltage at switch node X is triggered by the LS_OFT signal which turns off the low side switch, with timing based on feedback control implemented by the second signal generator 94.

Figure 12:
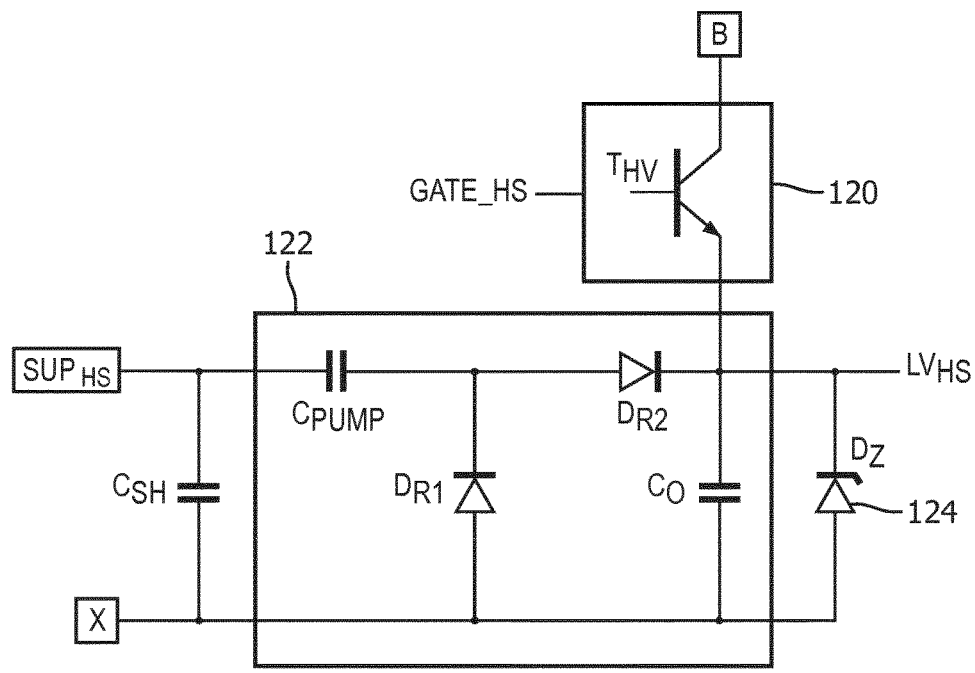
FIG. 12 shows an example of the implementation of the high side supply generation circuit.
Figure 13:
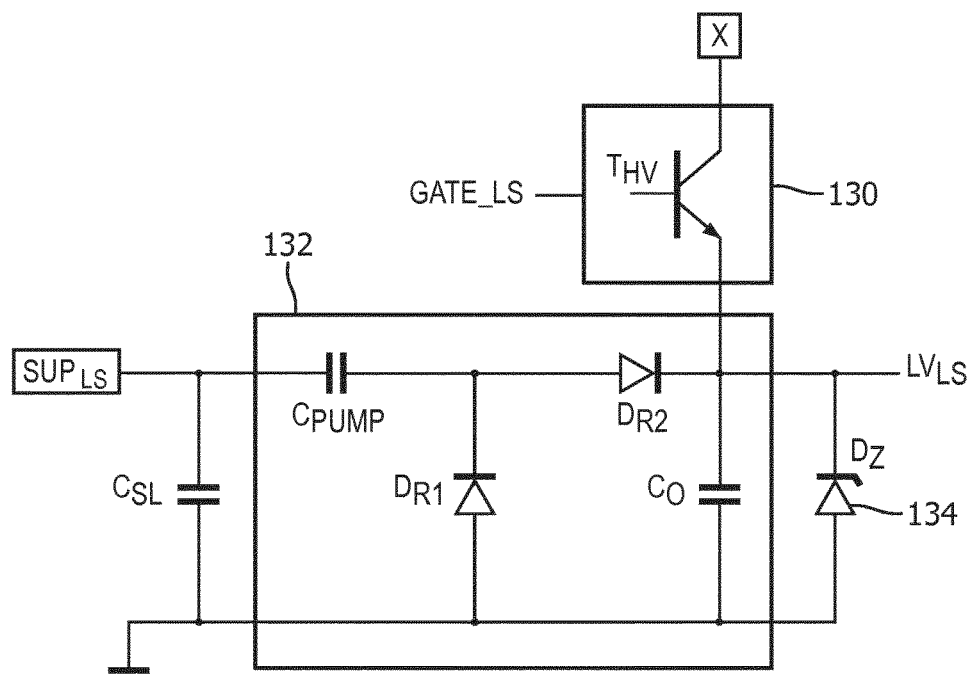
FIG. 13 shows an example of the implementation of the low side supply generation circuit.

FIG. 12 shows the first (high side) generating circuit. It comprises a supply transistor 120 between the high voltage line (node B) and the output $LV_{HS}$ of the first generating circuit. A charge pump circuit 122 is used for converting the AC voltage $SUP_{HS}$ at the first input into a DC voltage and storing it on a first output capacitor Co as the output of the first generating circuit at the first supply voltage. The low voltage rail for the circuit is the switch node X.

The second (low side) generating circuit is the same but operates in a different voltage domain. It has a supply transistor 130 between the switch node X and the output $LV_{LS}$ of the second generating circuit.

A charge pump circuit 132 is used for converting the AC voltage at the second input $SUP_{LS}$ into a DC voltage and storing it on a second output capacitor Co as the output of the second generating circuit at the second supply voltage. The low voltage rail for the circuit is the low voltage line 62.

Thus, in both cases, the local power supply has a high voltage low current transistor (BJT or MOSFET) which charges an output capacitor Co before the start-of-oscillation occurs. The gate signal to the transistor GATE_LS GATE_HS is controlled to switch off the transistor when oscillation starts.

In this way, the transistor may be considered to be a primary supply for startup, and the feedback from the resonant circuit provides a secondary supply which is used once the circuit is in oscillation.

The charge pump converts the AC peak-to-peak voltage across the input capacitor ($C_{SL}$ or $C_{SH}$) to a DC voltage across Co. A Zener function, represented by diode 124, 134, limits the output voltage in case of excessive supply.

As mentioned above, the converter may be used within an AC/DC converter, a DC/DC converter or a DC/AC converter. It may be used in a front end PFC circuit.

The front end PFC application of an LLC converter poses several problems for the feedback control of the inverter switch arrangement, which cannot be mastered by the conventional frequency control approach. This mainly has to do with the high gain ratio requirements. The gain ratio is the ratio between the maximum and the minimum gain.

The gain ratio problem can be relaxed if instead of the switching frequency, a threshold for an LLC state variable is used as the manipulating variable for controlling the input current. For example a threshold voltage may be set for the capacitor voltage across the capacitor of the LLC tank. Alternatively, the transformer voltage, or the transformer input current can also be used.

Figure 14:
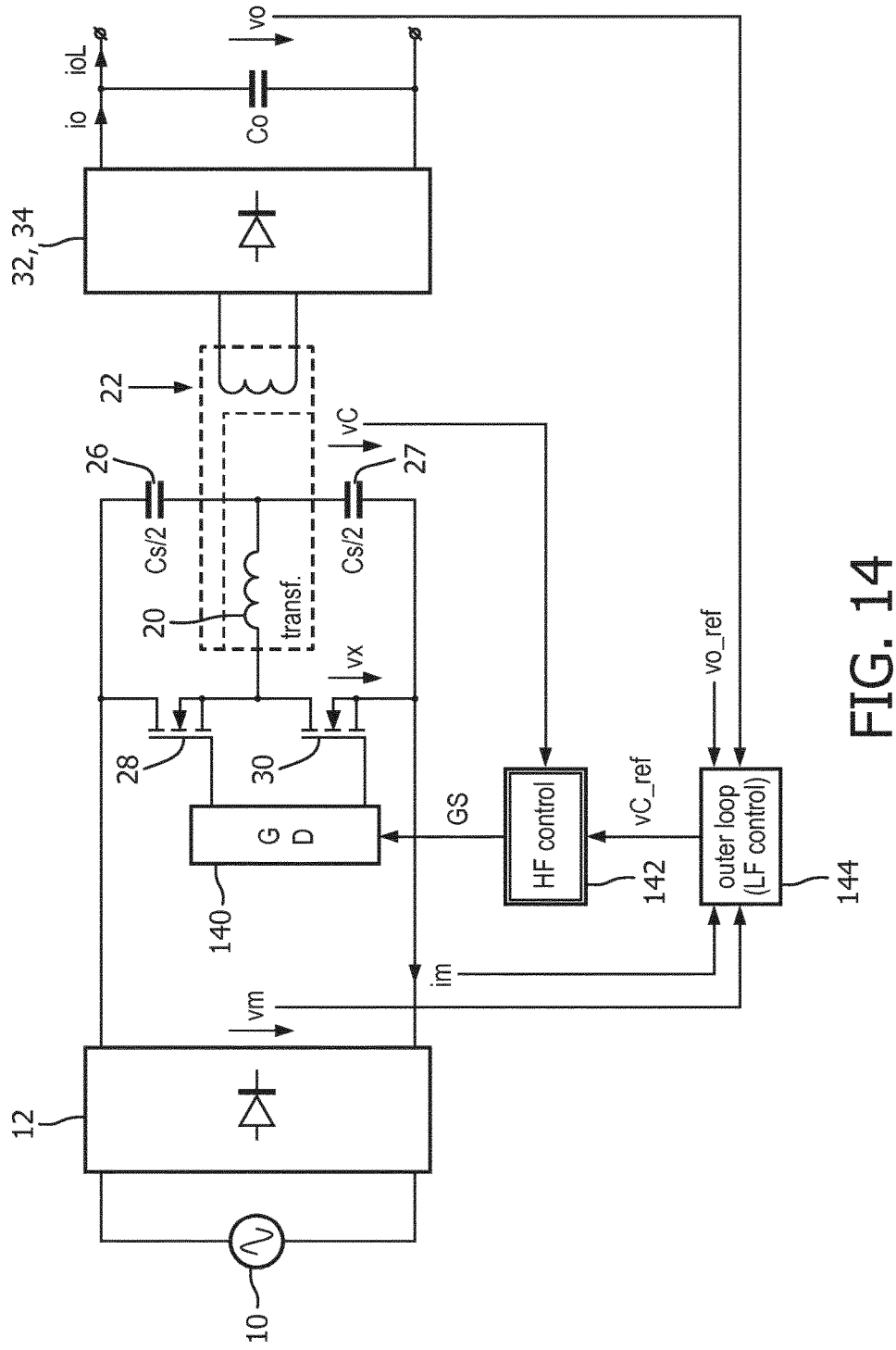
FIG. 14 shows another example of AC/DC LLC converter circuit which may use a converter of the invention.

FIG. 14 shows an AC/DC LLC converter circuit using the capacitor voltage as the control variable.

Figure 1:
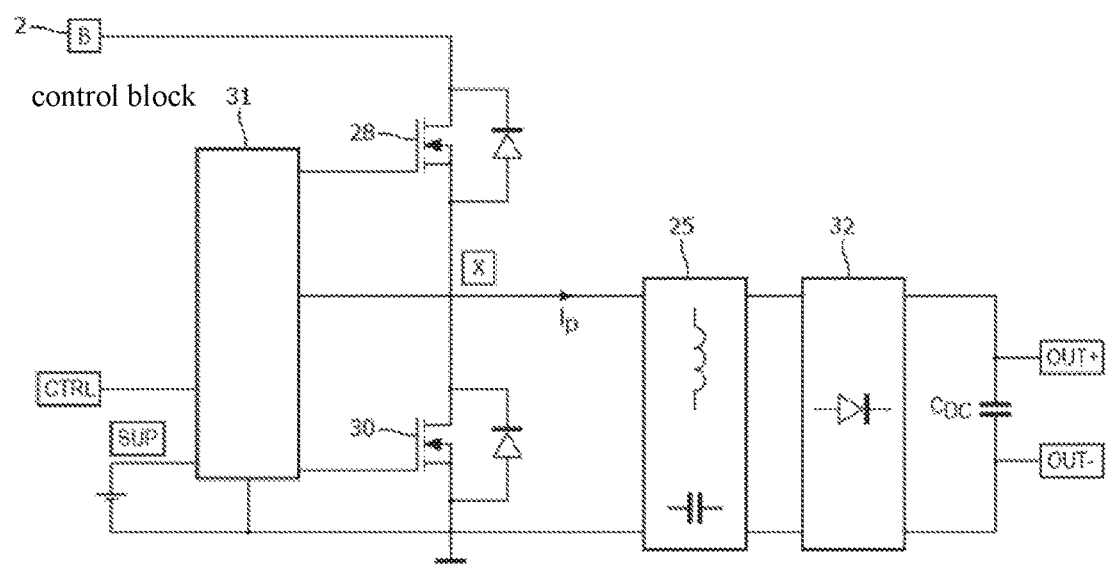
FIG. 1 shows the general architecture of a half bridge resonant converter.
Figure 2:
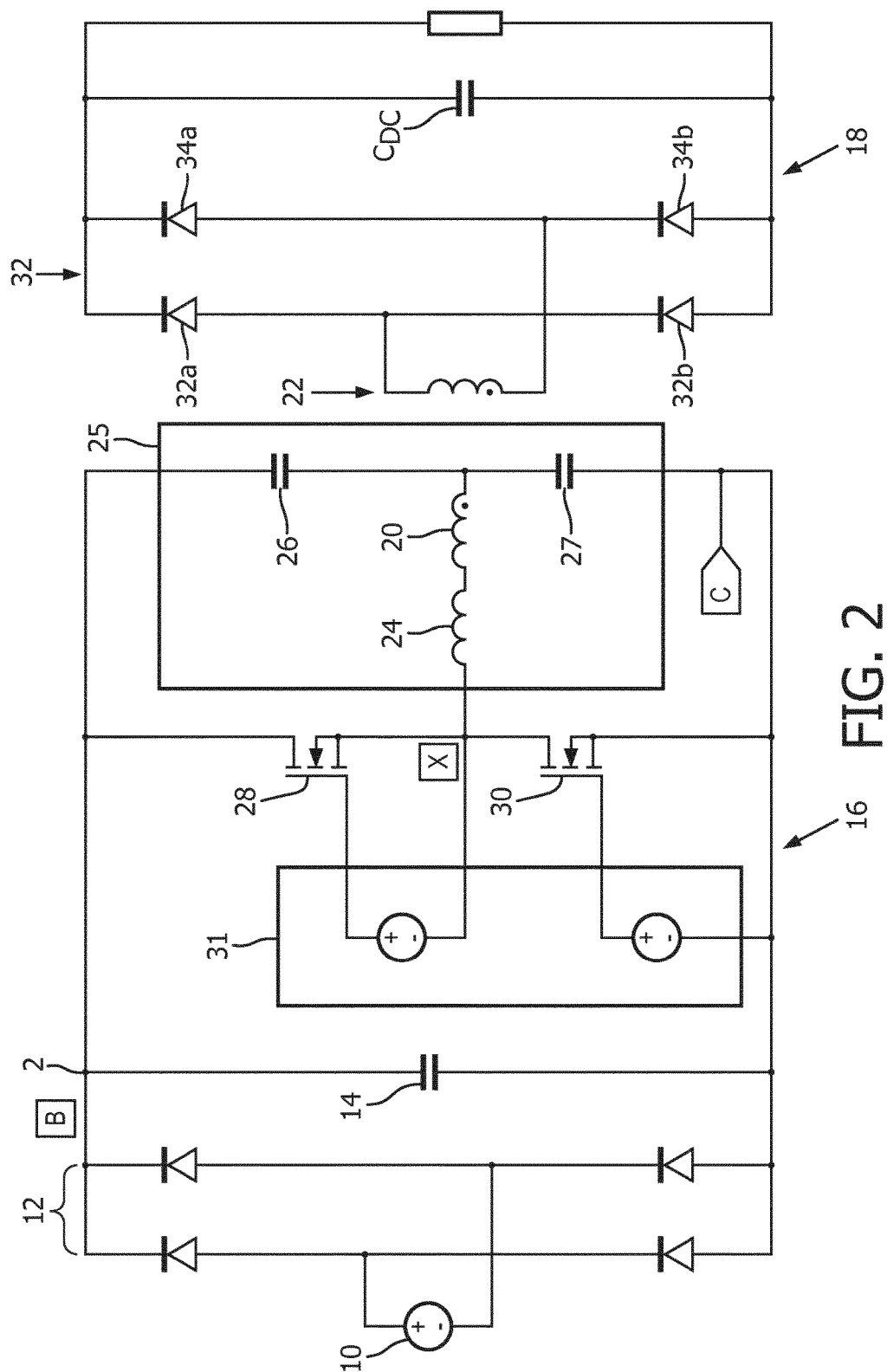
FIG. 2 shows one more specific example of a half bridge resonant converter used in a resonant AC/DC converter which forms a PFC stage.
Figure 3:
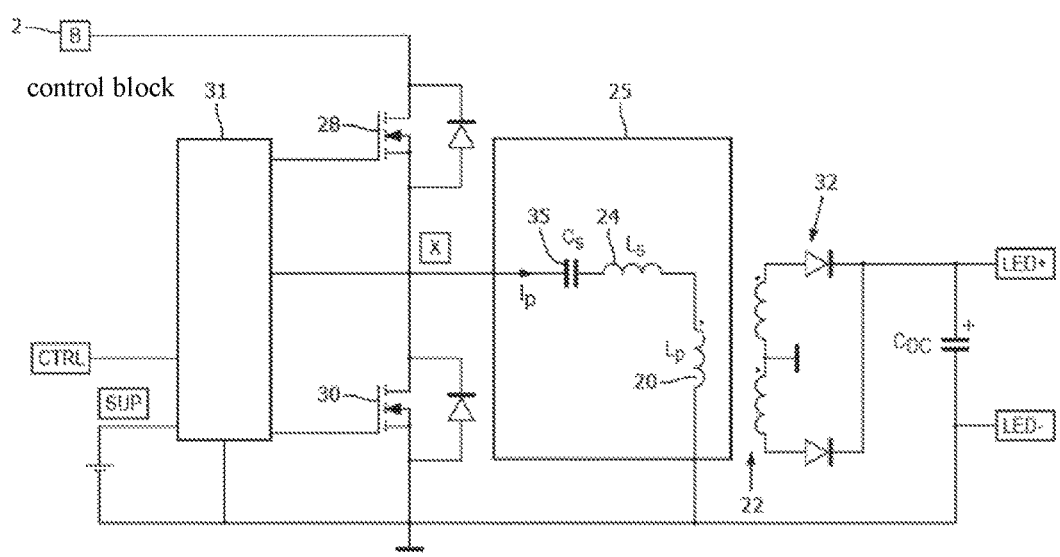
FIG. 3 shows another more specific example of a half bridge resonant converter used in a resonant DC/DC converter.
Figure 4:
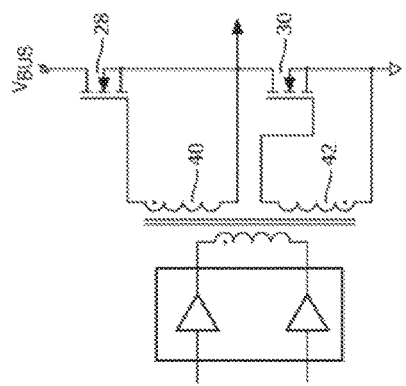
FIG. 4 shows a first known level shifting arrangement for generating gate drive signals.
Figure 5:
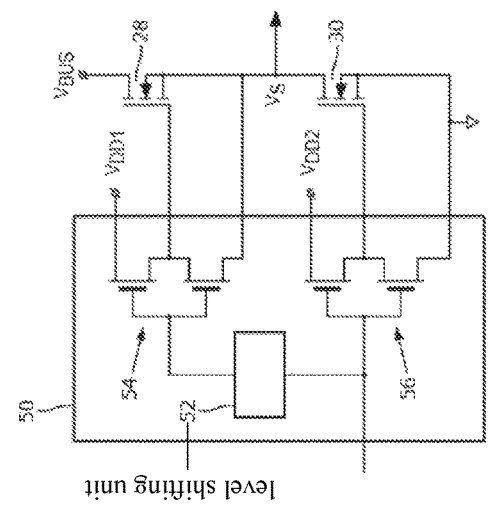
FIG. 5 shows a second known level shifting arrangement for generating gate drive signals.

As in FIG. 1, the circuit has an AC mains input 10 followed by a rectifier 12. The switches 28, 30 of the half bridge inverter are controlled by a gate driver 140 which is controlled by a controller 142. The controller outputs a gate drive signal GS.

The controller is provided with a threshold value which in this example is the threshold (or reference) capacitor voltage vC_ref. The controller 142 receives the measured quantity i.e., the actual resonant capacitor voltage vC, and processes the switching scheme for the gate driver 140 that in turn controls the inverter 28, 30 and the switch node voltage Vx, i.e. the voltage at the output of the half bridge inverter.

The controller thus has an outer control loop 144 for setting a threshold level for the electrical feedback parameter (the capacitor voltage) in dependence on the output voltage vo in this example and the input voltage and current vm, im, and an inner control loop 142 for comparing the electrical feedback parameter with the threshold to derive the gate drive signal.

The outer control loop 144 implements output control as well as implementing PFC, and the inner control loop 142 derives the switching control signal.

Figure 15:
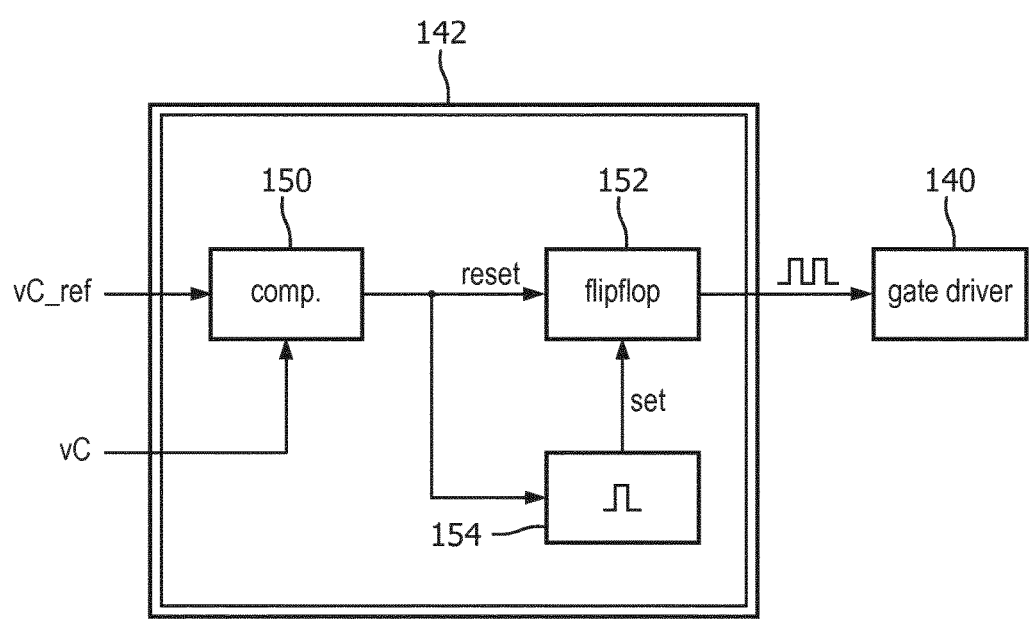
FIG. 15 shows the controller in FIG. 14 in more detail for a single threshold voltage implementation.

FIG. 15 shows the controller 142 in more detail. The measured capacitor voltage vC is compared with the reference vC_ref by comparator 150, and the comparison result is used to reset a flip flop 152 which generates the output for the gate driver 140. A delay element 154 provides a delayed set pulse so that the reset operation has a fixed duration (which is a function of the clocking speed of the flip flop).

This feedback system comprises a high frequency control loop implemented by the inner control loop 142.

The outer low frequency controller 144 receives the mains voltage vm, the actual mains current im and output voltage vo and its set point vo_ref and processes, in accordance with the power factor needs, the manipulating value of vC_ref for the switching unit.

In this example, there is only one threshold value (vC_ref) that is compared to a state variable (here vC). If the state variable exceeds the threshold, the flip-flop 152 in the controller 142 is reset and the inverter is switched off via the gate driver, i.e., the switch node voltage is set to its minimum value.

The inverter is switched on again a certain time after the switch off event. This time adapted to result in a symmetric operation i.e., at a duty cycle of the switch node of 0.5.

The capacitor voltage is one example of state variable which is used as a control input for the control of the inverter switching. An alternative state variable is the transformer voltage. The scheme is similar but signs have to be changed. For example, if a threshold is exceeded the flip flop 152 in the controller 142 has to be switched on.

In another scheme, there are two thresholds. The inverter is switched off (on) once the state variable exceeds a first upper threshold and the inverter is switched on (off) if the state variable passes a second threshold. Here, the second threshold is a function of the first threshold and the input voltage.

In this way, the control circuit is adapted to set a first threshold of the electrical feedback parameter for turning on the gate drive signal and a second threshold of the electrical feedback parameter for turning off the gate drive signal.

Instead of using a transformer as isolation means, isolating capacitors may be used as well. For example, by using an extra isolating (e.g. DC blocking) capacitor between the inverter switch node and the transformer, and another between the other primary side winding terminal and the midpoint of the resonant capacitors.

Alternatively, in order to save components, the resonant capacitors can also be designed for isolating from the mains voltage (Y-capacitors). Here the above mentioned state variable (vC) cannot be accessed directly any longer but can be derived by measuring and integrating the current into the isolating capacitors.

In any of these configurations, the transformer need not to be isolating and can be simplified, depending on the end use of the circuit.

There are various drive schemes that may be used for driving the high side and low side switches. Furthermore, the resonator may be self-oscillating or it may be driven by a frequency control circuit.

In general, a control scheme is required to drive the switches 28, 30 into their on- and off-states such that the output voltage or current is regulated to a certain desired value or range of values and for a PFC circuit also to implement power factor correction.

In order to exploit best the powertrain and to achieve the maximum efficiency, it is desired to operate the converter symmetrically (at least at full load) and to load the transformer and the rectifier in the secondary side equally. In the case of a transformer with center-tapped output windings that are symmetric in terms of turn-ratios and leakages, secondary side symmetry can be assured if the duty cycle of the half-bridge (i.e., its switch node) is kept at 50%.

There are basically four transitions that the control scheme must handle:
1. Turn-on of the high-side MOSFET 28;
2. Turn-on of the low-side MOSFET 30;
3. Turn-off of the high-side MOSFET 28;
4. Turn-off of the low-side MOSFET 30.

There are several known schemes that may be used in order to achieve this.

A. Von-Voff is a control scheme where transition number 4 is initiated when some state variable crosses a certain threshold voltage (Von). Following this, the control waits for a certain time (i.e., the dead-time) before starting transition 1. This dead-time ensures that cross-conduction, or shoot-through, does not occur. The half-bridge is now in the on-state. Eventually, either the same or a different state variable will cross a second threshold (Voff), and transition number 3 will be initiated. As with the transition to the half-bridge on-state, there will then be a dead-time before transition number 2 is initiated. The half-bridge is now in the off-state, and then the procedure continues from the beginning once more. The actual values of the two thresholds are determined by an outer control loop in order to yield the correct output. This is a Von-Voff scheme in that voltage threshold controls the switching on and off.

B. Von-Ton is a control scheme where transition number 4 is initiated when some state variable crosses a certain threshold voltage (Von). As in case A, the dead-time is allowed to pass before starting transition number 1. Transition number 3 is initiated based on a certain time interval elapsing. This may be a fixed interval, or a controlled interval. After the dead-time has then elapsed, transition number 2 is initiated, and then the procedure continues from the beginning once more. The actual value of the voltage threshold is determined by an outer control loop in order to yield the correct output, and the time threshold may be fixed or controlled dynamically. This is a Von-Ton scheme in that a voltage threshold controls the turning on (after a dead time) and the time duration of the on period of the half bridge is then controlled.

C. Voff-Toff is similar to case B, except that the voltage and time thresholds define the off and on transitions of the half-bridge, respectively. Transition number 3 is initiated when some state variable crosses a certain threshold voltage (Voff). The dead-time is allowed to pass before starting transition number 2. Transition number 4 is initiated based on a certain time interval elapsing. After the dead-time has then elapsed, transition number 1 is initiated, and then the procedure continues from the beginning once more. As in case B, the actual value of the voltage threshold is determined by an outer control loop in order to yield the correct output, and the time threshold may be fixed or controlled dynamically. This is a Voff-Toff scheme in that a voltage threshold controls the turning off and the time duration of the off period of the half bridge is controlled (i.e. between turning off the high-side MOSFET and turning it on again after the time duration and dead-time).

In cases B and C, it is most often desirable to control the on or off time such that it matches the off or on time respectively, i.e., it is usually beneficial to operate with a 50% duty cycle as mentioned above. There is no level shifter, gate drive transformer or any other means that could send synchronized signals between the first and second voltage domain of the first and second local control circuit. In order to yet allow constant duty cycle operation, the first control circuit (64) controls the duty-cycle via controlling the average switch node voltage (Vx) to be for example a fraction, preferably half, of the bus voltage. This is achieved by increasing the on-time of the high side switch if the measured and filtered switch node voltage (x) is lower than half the bus voltage and decreasing the on-time of the high side switch if the measured and filtered switch node voltage (x) is higher than half the bus voltage.

In summary, the four switching signals that have to be generated per cycle can be divided into two groups: The two turn-on signals may be considered as "slave" signals that are generated in response to the two "master" (i.e., turn-off) signals. The turn-on of the high side switch follows the turn-off of the low side switch after a certain dead time and the turn-on of the low side switch follows the turn-off of the high side switch after a certain dead time. The synchronization is achieved by observing the switch node voltage transition by means of the end-of-slope-detection circuits. In contrast, the "master" signal of the first control circuit for controlling the switching of the high side switch is generated based on the filtered (average) switch node voltage (Vx). Thus, Vx is used in two manners in order to synchronize the switching of the two voltage domains; in terms of the two transients (high to low and low to high) and of the average value of Vx. The second "master" signal (and thus, the remaining fourth required switching signal) is generated by the second control circuit (84) for controlling the switching of the low side switch and is based on the electrical feedback parameter from the converter input or output in order to provide the control of the converter's power factor and/or output voltage or current. This signal determines the switching frequency, which either is generated explicitly in case of a frequency control or implicitly, in case of a threshold detection of a self-oscillating resonant tank circuit.

In other cases, it is beneficial to operate with a defined duty cycle that is different from 50% in order to enlarge the output voltage or current window that the converter is capable of handling.

For threshold-based resonant converters (such as a self-oscillating LLC converters), there is no oscillator present in the circuit. Threshold-based switching has a particular advantage with regards to the linearity of the transfer function when using the converter to cover a wide range of input and output operating conditions, such as in an LLC PFC for example, and frequency control is not feasible in such cases due to extreme variations in the gain that cannot easily be handled.

The approach to the generation of the required voltages for switching the high side and low side power switches as explained above may be used in all of these situations.

The invention may be used in various applications, such as LED drivers in general, and in particular front end (isolating) converters for standalone drivers (indoor and outdoor), particularly miniaturized or flat types, offline drivers for track lighting, emergency lighting drivers, and miniature, isolating single stage LED drivers. The converter may also be used in single-stage separated extra low voltage (SELV) power converters for fixed output voltages and generally in consumer and office electronics applications such as laptop adapters.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a

The invention claimed is:

1. A half bridge resonant converter, comprising:
a pair of DC voltage lines arranged to provide a bus voltage, wherein the pair of DC voltage lines comprises a high voltage line and a low voltage line;
a half bridge inverter in series between the high voltage line and the low voltage line, wherein the half bridge inverter comprises a high side switch and a low side switch, wherein an output of the half bridge inverter is defined from a switch node between the high side switch and the low side switch;
a resonant circuit coupled to the output of the half bridge inverter;
a first control circuit for generating a first gate drive signal for controlling switching of the high side switch, wherein the first control circuit is arranged to control a duty cycle of the high side switch by increasing an on-time of the high side switch if an average switch node voltage is lower than a fraction of the bus voltage and by decreasing the on-time of the high side switch if the average switch node voltage is higher than the fraction of the bus voltage; and
a second control circuit for generating a second gate drive signal for controlling switching of the low side switch in dependence on an electrical feedback parameter.

2. The half bridge resonant converter as claimed in claim 1 wherein the first control circuit is arranged to turn on the high side switch after the low side switch is turned off and a dead-time has elapsed.

3. The half bridge resonant converter as claimed in claim 1 wherein the second control circuit is arranged to turn on the low side switch after the high side switch is turned off and a dead-time has elapsed.

4. The half bridge resonant converter as claimed in claim 1 wherein the second control circuit is arranged to control at least one of an output power and a power factor of the half bridge resonant converter by controlling the low side switch.

5. The converter as claimed in claim 1, wherein the first control circuit comprises:
a first end of slope detection circuit having the high voltage line as an input;
a first latch element triggered by the end of slope detection circuit and which generates a first control signal for switching the high side switch to a first state; and
a first signal generator for generating a second control signal for switching the high side switch to a second state.

6. The converter as claimed in claim 5, wherein the first signal generator has a reference input for controlling a duration of the first state.

7. The converter as claimed in claim 1, wherein the second control circuit comprises:
a second end of slope detection circuit having the switch node as an input;
a second latch element triggered by the second end of slope detection circuit and which generates a third control signal for switching the low side switch to a first state; and
a second signal generator for generating a fourth control signal for switching the low side switch to a second state.

8. The converter as claimed in claim 7, wherein the second signal generator has a feedback control input for controlling a duration of the first state in dependence on the electrical feedback parameter.

9. The converter as claimed in claim 1, wherein the electrical feedback parameter comprises a voltage which is dependent on an output current delivered by the converter to a load.

10. The converter as claimed in claim 1, wherein the resonant circuit comprises an LLC circuit.

11. The converter as claimed in claim 1, wherein the first circuit and the second control circuits each comprises an integrated circuit.

12. An apparatus comprising:
the half bridge resonant converter as claimed in claim 1; and
an output load.

13. The apparatus as claimed in claim 12 wherein the output load is an LED arrangement of one or more LEDs.

14. A conversion method, comprising:
operating a half bridge inverter comprising a high side switch and a low side switch between a DC high voltage line and a DC low voltage line providing a bus voltage, using a gate drive signal and providing an output from a switch node between the high side switch and the low side switch;
providing the output of the half bridge inverter to a resonant circuit;
generating a first gate drive signal using a first control circuit, for controlling a duty-cycle of the high side switch by increasing an on-time of the high side switch if an average switch node voltage is lower than a fraction of the bus voltage and by decreasing the on-time of the high side switch if the average switch node voltage is higher than the fraction of the bus voltage; and
generating a second gate drive signal using a second control circuit, for controlling switching of the low side switch in dependence on an electrical feedback parameter.

15. The method as claimed in claim 14, further comprising generating a first supply voltage from a high voltage line and from a voltage at the switch node, and generating a second supply voltage from the low voltage line and from the voltage at the switch node.

* * * * *